United States Patent
Primos et al.

(10) Patent No.: US 6,234,859 B1
(45) Date of Patent: *May 22, 2001

(54) ADJUSTABLE GAME CALL APPARATUS WITH MOISTURE DIVERTER AND PRECISION TUNING SYSTEM

(75) Inventors: Wilbur R. Primos, Jackson, MS (US); David A. Cardin, Eldorado, AR (US)

(73) Assignee: Primos, Inc., Jackson, MS (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/327,292

(22) Filed: Jun. 7, 1999

Related U.S. Application Data

(63) Continuation of application No. 08/881,247, filed on Jun. 24, 1997, now Pat. No. 5,910,039.

(51) Int. Cl.<sup>7</sup> ................................................ A63H 5/00
(52) U.S. Cl. .................................................... 446/207
(58) Field of Search .................................. 446/202, 204, 446/206, 207, 208, 209, 213

(56) References Cited

U.S. PATENT DOCUMENTS

| | | |
|---|---|---|
| 254,882 | 3/1882 | Munroe . |
| 752,447 | 2/1904 | Gebert . |
| 1,506,364 * | 8/1924 | Chiron et al. . |
| 2,198,993 | 4/1940 | Felgner ................................. 46/180 |
| 2,296,786 | 9/1942 | Hoeflich ............................... 46/180 |
| 2,321,193 | 6/1943 | Garrison .............................. 46/180 |
| 2,460,716 | 2/1949 | Shurley ................................ 46/180 |
| 2,530,155 * | 11/1950 | DeLuca . |
| 2,544,370 | 3/1951 | Walther ................................ 46/180 |
| 2,590,743 | 3/1952 | Wintriss .............................. 46/180 |
| 2,604,731 | 7/1952 | Meucci ................................. 46/180 |
| 2,608,796 | 9/1952 | Biocchi ................................ 46/180 |
| 2,745,214 | 5/1956 | Lawson ................................ 46/117 |
| 2,782,558 | 2/1957 | Harley ................................. 46/180 |
| 2,969,611 | 1/1961 | Warren ................................ 46/180 |
| 3,656,258 | 4/1972 | Thomas ............................... 46/180 |
| 4,041,827 | 8/1977 | Daglis ............................. 84/383 R |
| 4,050,186 | 9/1977 | Shultz ................................. 46/180 |
| 4,143,485 | 3/1979 | Stewart ............................... 46/180 |
| 4,387,531 | 6/1983 | Jacob .................................. 46/189 |
| 4,752,270 | 6/1988 | Morton ............................... 446/207 |
| 4,764,145 | 8/1988 | Kirby ................................. 446/208 |
| 4,950,198 | 8/1990 | Repko ................................ 446/207 |
| 4,976,648 | 12/1990 | Meline ............................... 446/207 |
| 5,222,903 | 6/1993 | Parrott ............................... 446/207 |

OTHER PUBLICATIONS

Herter catalog, date believed to be 1971.

Instruction set accompanying "Mossy Oak Gander Land'r—M1006L Game Call," undated.

* cited by examiner

Primary Examiner—John A. Ricci
(74) Attorney, Agent, or Firm—Foster & Foster

(57) ABSTRACT

An adjustable game call apparatus includes a sounding board, an air passageway formed in the sounding board, and a vibrating reed positioned within the air passageway adjacent the sounding board. A pair of guide posts extend upward from the sounding board to receive a pair of cut-out areas formed in the reed. The slots and posts allow the reed to be longitudinally adjustable relative to the sounding board of the game call apparatus. Another aspect of the game call apparatus comprises a moisture diverter system which involves a plurality of diverters formed in the sounding board to direct moisture away from the reed and toward a trough formed in the sounding board. The diverters also provide a precision tuning system for the game call to ensure the full high and low ends of the desired range of tones are produced by the game call.

7 Claims, 4 Drawing Sheets

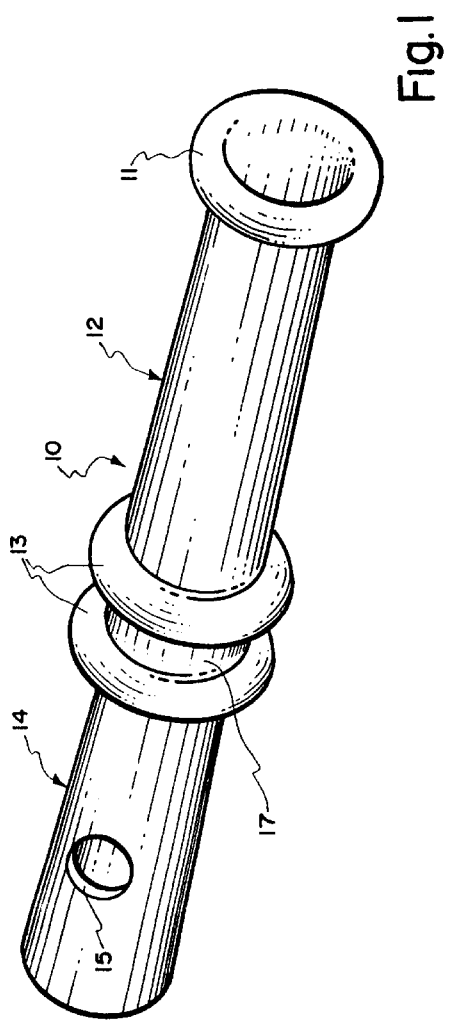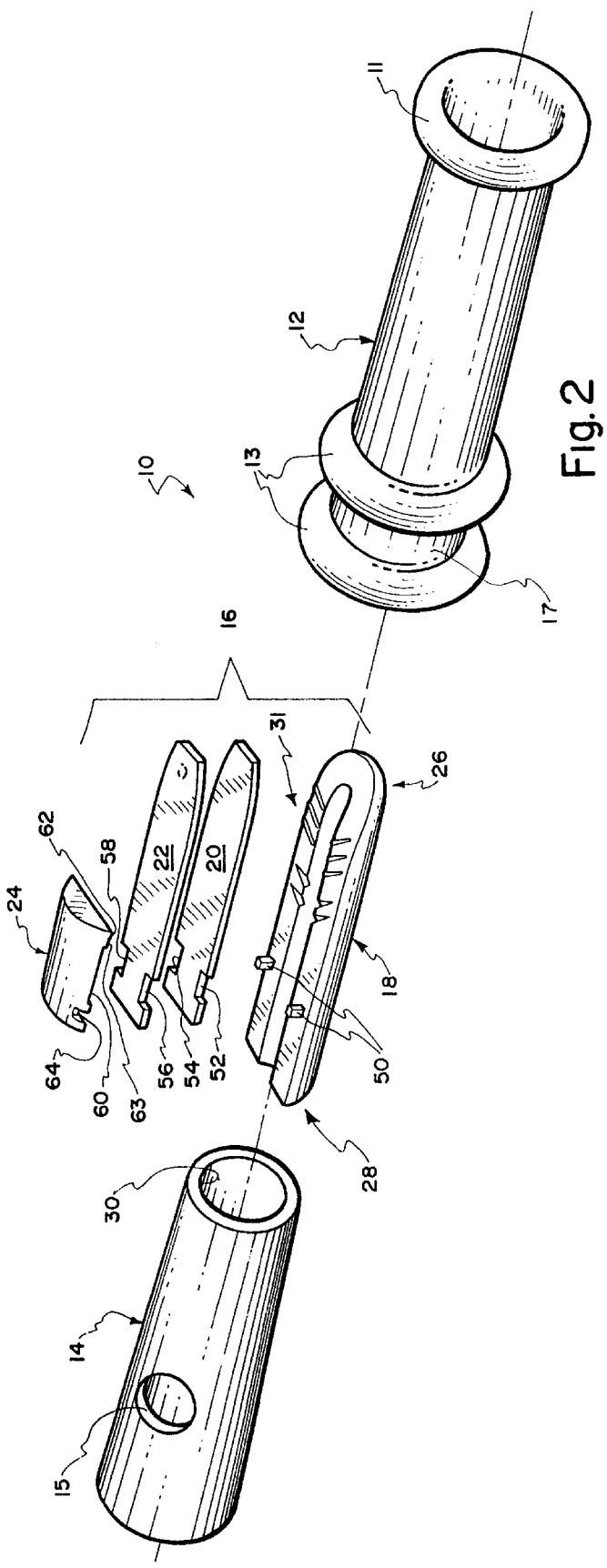

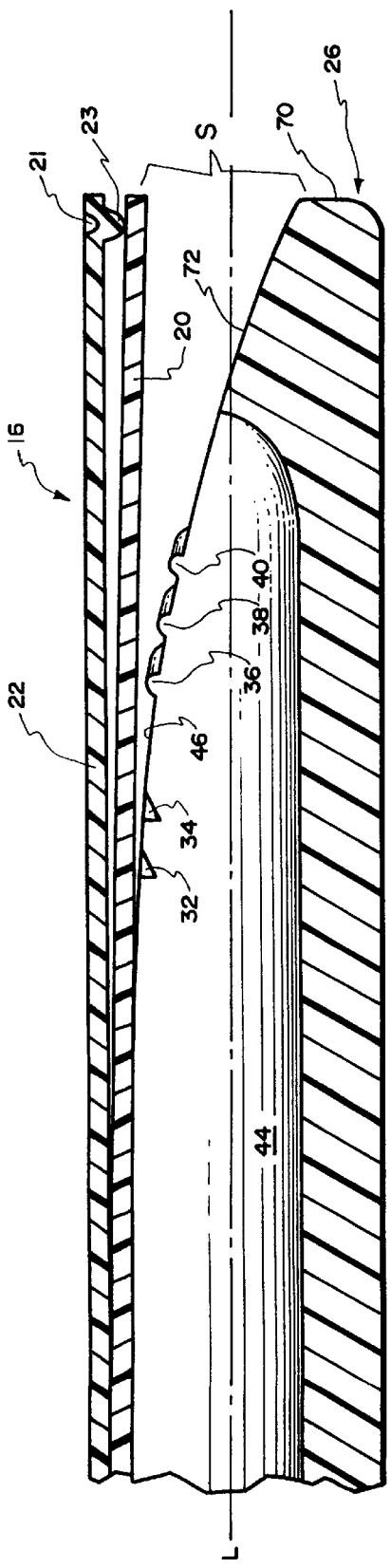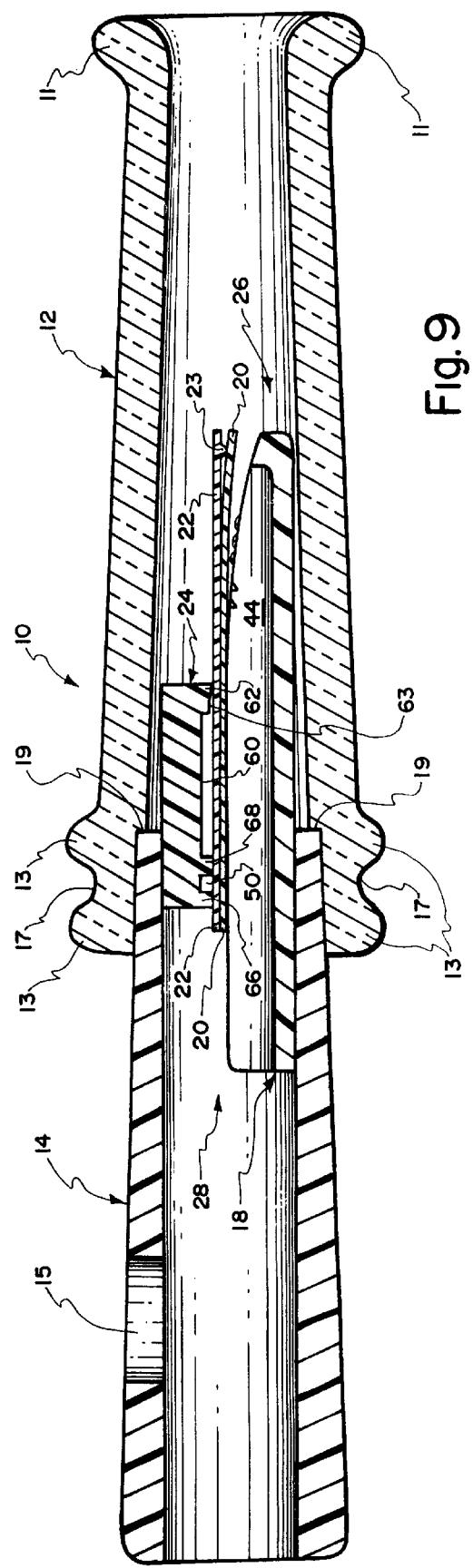

ADJUSTABLE GAME CALL APPARATUS WITH MOISTURE DIVERTER AND PRECISION TUNING SYSTEM

RELATED APPLICATION

This is a continuation of U.S. patent application Ser. No. 08/881,247, filed Jun. 24, 1997, now U.S. Pat. No. 5,910,039.

TECHNICAL FIELD

This invention relates to wildlife calls, and more particularly to devices used by hunters to simulate sounds of game animals.

BACKGROUND OF THE INVENTION

Various types of calls for wildlife animals have been developed over the past many decades. These calls generally attempt to simulate sounds of particular wildlife animals. Most traditional wildlife animal calls are used by hunters to call game—the wildlife which is the object of their pursuit. Game calls attempt to simulate the sounds of the particular game being hunted. Game calls may act as lures to attract the game to the hunter's vicinity or may act to put the game at ease. Efforts have been made for decades to improve game calls and develop more effective ways to simulate sounds of game animals.

Game calls have traditionally been built in standardized forms with respect to sound reproduction. While the aesthetics of game calls have been highly varied, indeed a specialized art form among many, the basic construction of the internal components of the call (i.e., the reed, the sounding board, and the barrel) have traditionally been standardized for consistent sound reproduction. Manufacturing processes have been set up to ensure that game calls produce substantially similar sounds for the majority of persons using the call. Therefore, internal configurations of traditional game calls has traditionally varied little.

For obvious reasons, standardization of the sound-producing components of game calls presents difficulties for many users of the game calls. People using the game calls have different preferences, physical attributes, and different calling abilities with respect to the game calls. It is quite common for a standardized game call to be highly useful in the hands of one hunter, yet less effective, and perhaps even unusable, in the hands of another hunter.

Another difficulty with respect to traditional game calls, mentioned above, is that they are manufactured to produce a particular sound without much variation irrespective of the particular user. As such, traditional game calls have been built so that the vibrating structure, such as a reed, is secured at a single, specific location relative to the sounding board of the call. The only way to vary the tone produced by such calls, if at all, is where the individual users change their method of calling. Changes in the tone produced are highly limited given the standardized construction.

Still another problem with traditional game calls, particularly game calls requiring the use of a vibrating structure, such as a reed, a diaphragm, or an elastic material, relates to the introduction of moisture into the game call in areas surrounding the vibrating structure. Moisture may enter into a game call, for example and without limitation, in the form of saliva from the user's mouth, moisture from the user's breath, perspiration from the user's body (from carrying the call close to the user's body), or water from the outside environment. Sometimes exacerbating the moisture accumulation problems are the extreme weather conditions often associated with hunting.

Problems associated with moisture accumulation inside the call become especially acute where the game call involves multiple reeds or vibrating members. If there are two reeds, moisture may accumulate between them causing the reeds to stick together. Moisture may also accumulate on the top or bottom side of the reed combination causing the reeds to stick to the top or bottom structure adjacent the reeds. Similarly, even if the game call utilizes only one reed, moisture may accumulate on either side of the reed. Accumulated moisture often reduces the effectiveness of the call and, often times, will render the game call completely ineffective.

Yet another problem associated with the construction of a game call is that almost any modification made to the sounding board will affect the range of notes produced by the call. Thus, solving the moisture accumulation problem by modifying the configuration of the sounding board creates another entirely different set of problems. Specifically, by including moisture diverters, both channels and raised ribs, in the sounding board will change the tones produced by the call. Therefore, the problem of controlling the precise range of tones to be produced by the call when incorporating a moisture diverter system must be addressed.

Another traditional challenge with the manufacture of game calls has been the desire to develop a system for precision tuning of a game call. Prior attempts to modify the tones produced in the game call have focused on changing the overall sounding board configuration. In spite of many attempts, difficulties have remained. A precision tuning system must provide an ability to adjust the full range of desired tones, both on the low and high ends of the range.

Still another problem associated with game calls, particularly calls that can be disassembled and reassembled, relates to the assembly of components so as to ensure consistent, repeatable positioning of the components of the call to create the desired tones. Prior attempts have been made to include holes in the reed which are inserted over corresponding posts in the main body portion of the call. Repeatable assembly of call components is possible with this type of construction. The drawback of this system, however, is that there is no ability to adjust the reed relative to the sounding board of the call to vary the tones of the call.

In light of the foregoing, there has been a continual need to develop a game call apparatus that can be adjusted by the users, depending on their preferences and abilities. A need also exists to develop a game call apparatus that can be adjusted by a particular user to change the sounds produced by the game call. More specifically, there is a need to develop a game call that includes a system for adjusting a vibrating member, such as a reed, relative to the sounding board of the game call.

There is further a need to develop a system for preventing moisture from accumulating next to the vibrating, sound-producing structure of a game call. Another need exists to direct accumulated moisture, once introduced into areas adjacent the vibrating structure, toward other portions of the game call away from the vibrating structure so that the detrimental effects associated with moisture are minimized. A need also exists to develop a precision tuning system for a game call that will allow precise adjustments to be made to the high and low ends of the desired range of tones produced by the call. Yet another need exists to develop a game call apparatus that will allow exact repositioning of the game call components as desired by the user of the game call, yet allow the reed to be adjustable.

SUMMARY AND OBJECTS OF THE INVENTION

It is therefore a primary object of the present invention to provide a game call apparatus that is adjustable.

Another object of the invention is to provide a game call apparatus that includes a reed that is adjustable relative to the main body portion (e.g., the sounding board) of the call.

A further object of the invention is to provide a game call apparatus that includes a reed that is longitudinally adjustable relative to the main body portion of the call.

Another object of the invention is to provide a game call apparatus that is infinitely adjustable between two extreme positions.

Still another object of the present invention is to provide an adjustable game call apparatus that can be adjusted to suit a particular user's physical attributes.

Another object of the present invention is to provide a game call apparatus that can be adjusted to vary the sounds produced by the game call apparatus.

Yet another object of the present invention is to provide a game call apparatus that is adjustable to satisfy the personal preferences of a particular user.

Another object of the invention is to provide a game call apparatus with a reed having a pair of cut-out areas positioned about opposed posts whereby the reed can be adjusted longitudinally relative to the call between two extreme positions defined by the cut-out areas of the reed.

Still another object of the present invention is to provide a game call apparatus that prevents accumulation of moisture adjacent a vibrating, sound-producing structure of the call.

Another object of the invention is to provide a game call apparatus that includes a system for diverting moisture away from areas adjacent a vibrating reed.

Yet another object of the present invention is to provide a game call apparatus that includes a plurality of diverters formed in the main body portion of the game call adjacent a vibrating structure to divert moisture away from the vibrating structure to prevent moisture from accumulating next to the vibrating structure.

Still another object of the present invention is to provide a game call apparatus that includes a plurality of diverters in the form of raised ribs formed in the main body portion of the game call adjacent a vibrating structure to divert moisture away from the vibrating structure to prevent moisture from accumulating next to the vibrating structure.

Still another object of the invention is to provide a game call apparatus that includes a plurality of diverters in the form of channels formed in the main body portion of the game call adjacent a vibrating structure to divert moisture away from the vibrating structure to prevent moisture from accumulating next to the vibrating structure.

Another object of the invention is to provide a game call apparatus that includes a combination of diverters including raised ribs and channels formed in the main body portion of the game call adjacent a vibrating structure to divert moisture away from the vibrating structure to prevent moisture from accumulating next to the vibrating structure.

Yet another object of the invention is to provide a game call apparatus that allows the various sound-producing components to be assembled, disassembled, and reassembled in repeatable positions.

Still another object of the invention is to provide a game call apparatus that allows for repeatable repositioning of reed components, yet allows the sound-producing reed to be adjustable relative to the sounding board of the game call.

Another object of the invention is to provide a precision tuning system for the game call by which the sounding board is modified to allow the game call to produce the high and low ends of a desired range of tones.

Another object of the invention is to provide a combination moisture diverter system and a precision tuning system for the game call by which the sounding board is modified to divert moisture away from the vibrating, sound-producing member and still allow the game call to produce the high and low ends of a desired range of tones.

Another object of the invention is to provide a plurality of channels and/or raised ribs on the sounding board to provide a precision tuning system for the game call.

The foregoing objects are achieved by an adjustable game call apparatus that includes a plurality of components comprising a main body portion (e.g., a sounding board), an air passageway formed in the main body portion, a vibrating reed positioned within the air passageway, and a wedge piece to hold the vibrating reed in position relative to the main body portion of the call. Opposed notches or cut-out areas are formed in the reed and are positioned about a pair of posts extending from the main body portion. The combination of the cut-out areas and the posts allow the reed to be longitudinally adjustable relative to the main body portion of the call. In addition, the cut-out areas and posts allow the wedge piece that holds the reed in place to be repositioned in a repeatable location. The vibrating reed is infinitely adjustable between an extreme proximal position and an extreme distal position.

Another aspect of the present invention relates to a moisture diverter system incorporated into the game call apparatus to prevent moisture from building up inside the call adjacent the vibrating structure of the call. A plurality of diverters in the form of channels and raised ribs (i.e., ridges and ditches) are disposed along the main body portion of the call adjacent the reed. In a preferred embodiment the diverters run at an angle generally transverse to the longitudinal axis of the game call. The diverters direct accumulated moisture toward a trough in the call away from the vibrating reed to prevent the vibrating reed from being adversely affected by moisture accumulation.

Still another aspect of the present invention relates to a precision tuning system which involves the formation of a plurality of channels and/or raised ribs on the sounding board under the reed. The raised ribs and channels modify the sounding board to precisely adjust the high and low ends of the desired range of tones.

Other objects, features, and advantages of the invention will become apparent from the following detailed description of the invention with reference to the accompanying drawings.

BRIEF DESCRIPTION OF THE DRAWINGS

Preferred embodiments of the invention are described below with reference to the accompanying drawings:

FIG. 1 is a perspective view of a game call apparatus according to the present invention;

FIG. 2 is an exploded perspective view of a game call apparatus according to the present invention;

FIG. 9 is a sectional side elevation view of a game call apparatus according to the present invention; and FIG. 10 is an enlarged sectional side elevation view of one position of the adjustable reeds relative to the sounding board portion of the game call apparatus.

DETAILED DESCRIPTION OF THE INVENTION

Figure 3:
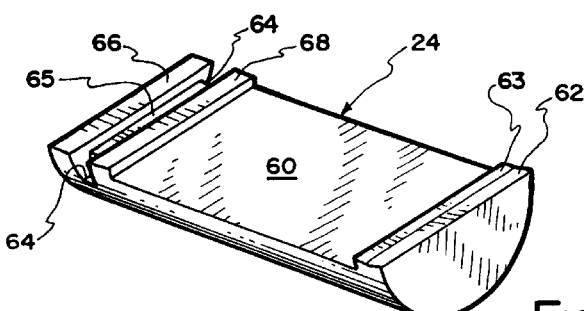
FIG. 3 is an enlarged perspective view of a wedge piece, shown in an inverted position, of the reed assembly of the game call shown in FIG. 2.
Figure 4:
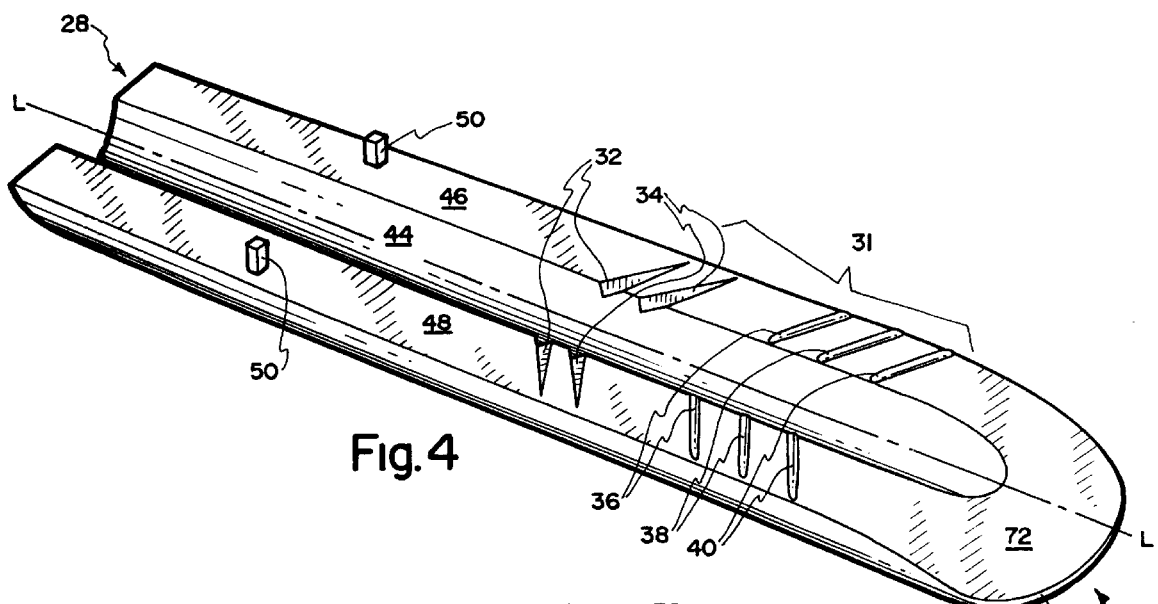
FIG. 4 is an enlarged perspective view of a sounding board of the reed assembly of the game call apparatus, the sounding board having a trough and a plurality of moisture diverters.

FIGS. 1 and 2 show an adjustable game call apparatus 10 according to the present invention. The game call apparatus 10 comprises generally a barrel or mouthpiece section 12 (which defines an inlet end of the call), a bell section 14 (which defines an outlet end of the call) including a tone variation aperture 15 and a reed assembly section 16. The reed assembly section 16 further comprises a base or sounding board 18, a first vibrating reed 20, a second vibrating reed 22, and a wedge piece 24. The reeds 20, 22 are sound producing reeds such that passage of a predetermined flow of air through the call will cause reeds 20, 22 to vibrate and produce the desired sounds.

The reed assembly 16 also comprises a proximal end 26 (which is closest to the user's mouth when the call is being used) and an distal end 28. Upon assembly of the various components of the reed assembly 16, the distal end 28 is inserted into an opening 30 formed at one end of the bell section 14. The distal end 28 of the reed assembly 16 will be slightly larger in diameter than the opening 30, thus creating a friction fit. When the reed assembly 16 is inserted into opening 30 of the bell section 14, the various components of the reed assembly are held securely in place relative to one another.

The barrel or mouthpiece section 12 includes an annular flange 11 against which the user may place his or her lips. In addition, a pair of circular ribs 13 are formed in the mouthpiece portion 12 to form an annular groove 17 in the mouthpiece body. A lanyard or other carrying device may be secured between ribs 13 so as to fill at least partially the annular groove 17.

After the reed assembly 16 is secured inside the bell portion 14, the barrel or mouthpiece section 12 is inserted over the entire reed assembly 16 to engage the bell section 14 (see FIG. 9). The mouthpiece section 12 includes an annular shoulder 19 which bears against one end of the bell section 14.

FIGS. 2–6 show details of the reed assembly 16, and more particularly, the moisture diverter and precision tuning system of the present invention. As shown in detail in FIGS. 2, and 4–6, the moisture diverter and precision tuning system comprises a plurality of diverters in the form of pairs of opposed channels 32, 34 and a plurality of pairs of raised ribs 36, 38, 40. The channels and ribs extend at an angle generally transverse to the longitudinal axis L of the reed assembly 16. The moisture diverter and precision tuning system (referred to generally by reference numeral 31) diverts moisture that may enter the call away from the reeds 20, 22 and toward a main trough 44 of the call. The trough 44 forms an air passageway through the game call. The diverters terminate at the edge of the main trough 44. Moisture may enter into the interior of the game call apparatus from many sources, including without limitation, moisture from the user's mouth, saliva from the user's mouth, perspiration, dew on branches and leaves, rain and snow, etc. Moisture diverted away from the reeds 20, 22 will not adversely affect to any significant degree the tones produced by the game call apparatus.

Figure 5:
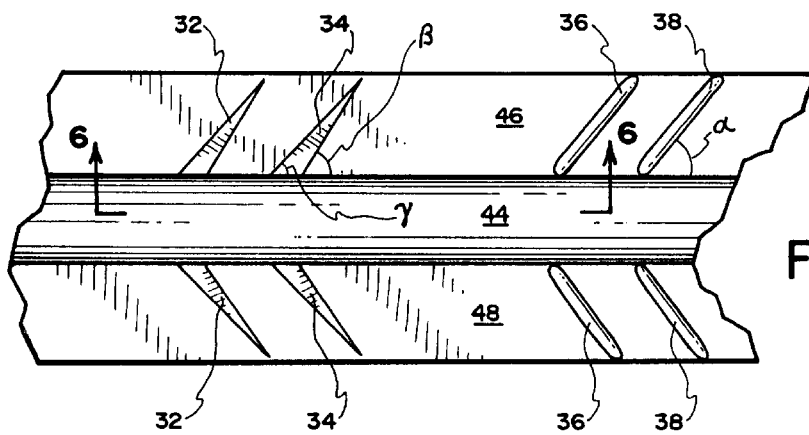
FIG. 5 is a partial top view of the diverters formed in the sounding board of the call as shown in FIG. 4.
Figure 6:
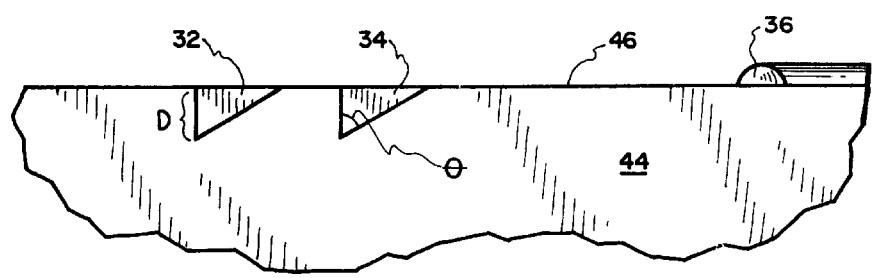
FIG. 6 is a partial side elevation view, taken along the line 6—6 of FIG. 5, showing moisture diverters (two channels and one raised rib) according to the present invention.

FIGS. 5 and 6 show the details of the diverters, including the channels 32, 34 and the raised ribs 36, 38, 40. As shown in FIG. 5, the ribs 36, 38, 40 (only rib 36 is shown), are disposed at an angle a relative to a longitudinal axis L of the game call apparatus. Angle $\alpha$ is preferably 45°, but other angles may be utilized without departing from the scope of the present invention. The ribs as shown do not extend to the extreme outer peripheral edges of the call, but preferably extend inwardly to intersect the trough 44. Other configurations are possible without departing from the scope of the present invention.

Concerning the channels, FIG. 5 shows the leading edges of the channels inclined at an angle $\beta$ relative to the longitudinal axis L of the game call apparatus. Angle $\beta$ is preferably 52°. The trailing edge of the channel is positioned at an angle $\gamma$, preferably 45°, relative to the longitudinal axis L of the game call apparatus. The depth D (FIG. 6) of the channels 32, 34 is preferably about 0.022 inches where the channels 32 meet the trough 44. The left side of each channel 32, 34 (as shown in FIG. 6) is substantially vertical and perpendicular relative to the top surface 46 of sounding board 18. The right side (as shown in FIG. 6) is inclined at an angle $\theta$, which is preferably 60°. The channels preferably will intersect with the trough 44, and may or may not extend toward the extreme peripheral edges of the call. In a preferred embodiment, the channels slope upwardly from the trough 44 at a depth D and terminate at top surfaces 46, 48. At the ends of the channels 32, 34 opposite the trough 44, the two sides of each channel converge toward each other as they extend toward the periphery of the sounding board 18. It is to be understood that the above-specified angles and dimensions of the channels merely reflect preferred embodiments, and other angles and dimensions may be used without departing from the scope of the present invention.

It may be desirable to use fewer or more diverters/ precision tuning structures in the form of channels (32, 34) or raised ribs (36, 38, 40) than what is shown in the preferred embodiment of FIGS. 2 and 4–6, without departing from the scope of the present invention. Furthermore, the diverters/ precision tuning structures may be configured in pairs, offset from one another, or presented in other configurations. Still further, channels alone or raised ribs alone may be used as diverters to divert moisture or as precision tuning structures without departing from the scope of the present invention.

In operation, the diverter system acts to direct accumulated moisture from locations adjacent the reeds 20, 22 toward the trough 44 of the sounding board 18 of the main body portion of the call. Typically, when using the call, some of the more common problems associated with moisture build up result from saliva and breath moisture from the user. In most instances where traditional game calls are used, the moisture would cause the reeds. 20, 22 to stick together.

If a single reed were used, moisture may accumulate on the top and/or bottom sides of the reed to cause the reed to stick against one or both of the sides adjacent the top or bottom of the reed. With respect to the present moisture diverter system, moisture will typically enter from the inlet end of the reed (the proximal end 26 of the reed assembly) and will encounter sequentially opposed ribs 40, 38, and 36. The ribs are angled to catch such moisture and direct it toward the trough. A substantial portion of the moisture entering the call will be diverted into the trough 44 at this initial stage of the moisture diverter system. Subsequently, any residual moisture will encounter consecutively channels 34 and 32. The channels are likewise angled to catch accumulated incoming moisture and direct it toward the trough. The channels also slope gradually toward the trough so moisture entering and collecting in the channels will empty into the trough. The diverter system of the present invention is ideally suited to direct the majority of the moisture that will typically be introduced inside a game call toward the trough and away from the vibrating reeds.

The present moisture diverter system may be used in combination with a known prior method of preventing two reeds from sticking together. Specifically, the top reed 22 may include an indentation 21 on one side (see FIG. 10). This indentation 21 will cause a corresponding dimple 23 to form in the opposed surface of the reed. The dimple 23 will separate the reeds a given distance according to the size of the dimple. Where the dimple is located toward an extreme end of the two side-by-side reeds, substantial separation will be maintained at the extreme proximal end 26 and will taper until the two reeds engage one another moving toward the distal end 28 (see FIGS. 9 and 10).

As briefly set forth above, in addition to diverting moisture away from the reeds and toward the trough 44, the plurality of channels 32. 34, and raised ribs, 36, 38. 40 provide another inventive aspect to the call. Almost any modification to the sounding board 18 of the call will affect to some degree the tones produced by the call. It has been determined through the inventive process that the location and configuration of the channels 32, 34 and the raised ribs 36, 38, 40 can dramatically and precisely change the tones produced by the call. Virtually any desired change to the tones (both on lower and higher ends of the range of tones) can be effected using the channels and/or raised ribs. It has been traditionally difficult to modify the sounding board in any manner and not lose the lower range of tones or the higher range of tones. The channels and raised ribs allow the sounding board of the game call to be modified without losing the desired range of tones that existed prior to the modification. Indeed, superior ranges of tones can be produced by the channels and raised ribs, as compared to a pre-modified sounding board.

FIGS. 2, and 7–10 show the adjustability feature of the present invention. The reed assembly 16 includes a unique feature that allows the reeds 20, 22 to be moved relative to the main body portion (which might refer to all portions of the call, including the sounding board 18, other than the reeds 20. 22). A pair of posts 50 extend from the upper surfaces 46, 48 of the sounding board section 18 of the reed assembly 16. Reed 20 includes notches or cut-out areas 52, 54, which allow reed 20 to be inserted over posts 50. Similarly, reed 22 includes notches or cut-out areas 56, 58 which similarly allow reed 22 to be inserted over posts 50. The notches in reeds 20, 22 can be inserted over posts 50 only upon proper orientation. The posts provide positive stops for engaging edges of the reeds 20, 22 at the slots so that the reeds can be secured in a precise extreme proximal and distal locations relative to the sounding board 18.

Figure 7:
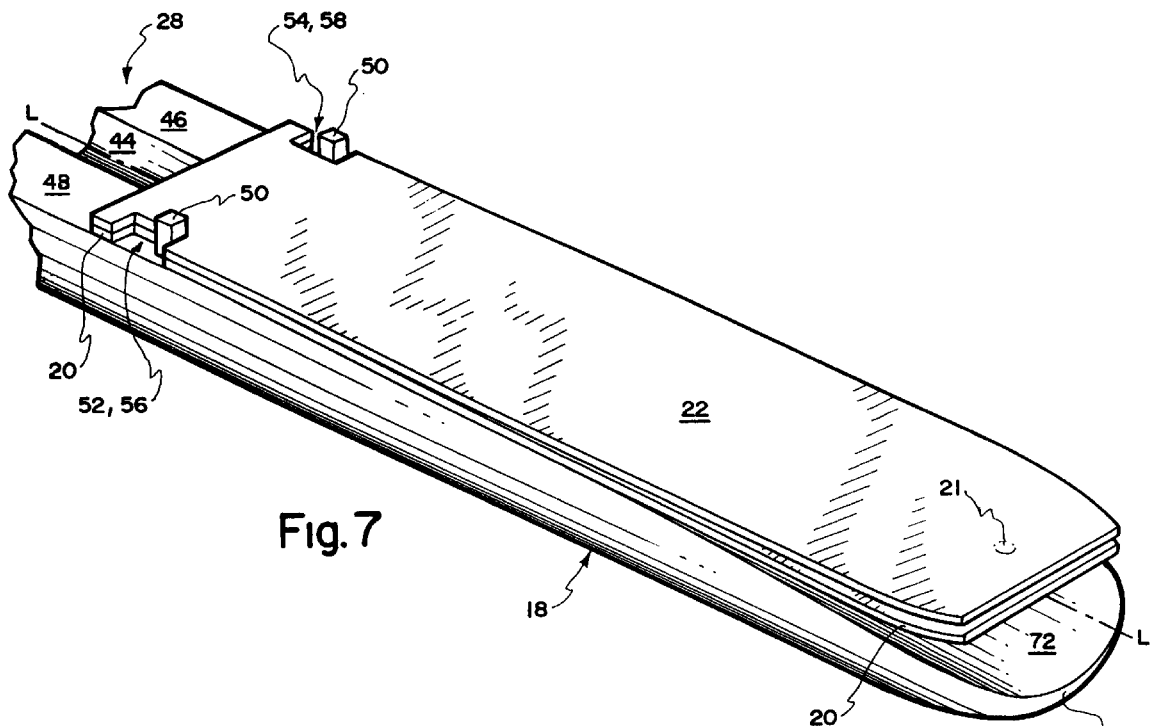
FIG. 7 is a perspective view of a pair of reeds having opposed slots disposed over corresponding opposed posts formed in the sounding board of the game call apparatus, the reed assembly being positioned at an extreme distal position relative to the main body portion of the game call apparatus.
Figure 8:
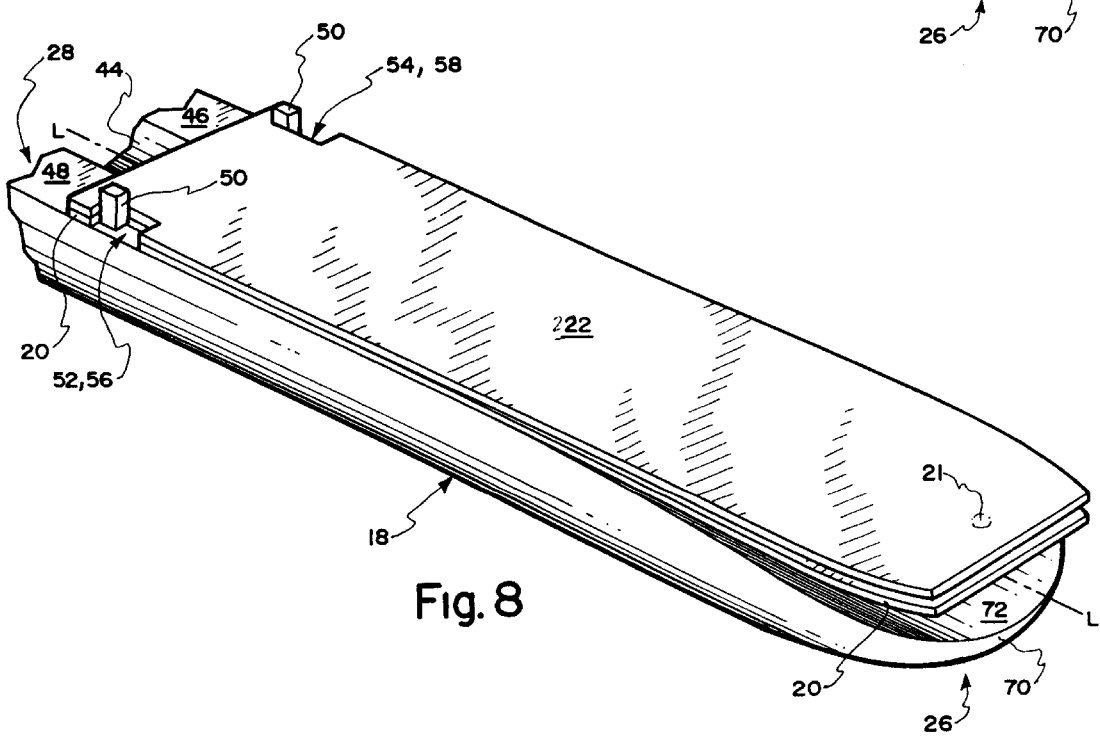
FIG. 8 is a perspective view of a pair of reeds having opposed slots inserted over corresponding opposed posts formed in the sounding board of the game call apparatus with the reed assembly being positioned in an extreme proximal position relative to the main body portion.

FIG. 7 shows the reeds 20, 22 positioned at an extreme distal or rearwardmost location relative to the main body portion of the game call. The posts 50 engage the forward edges of the slots of reeds 20, 22 in this position. FIG. 8 shows the reeds 20, 22 adjusted to an extreme proximal or forwardmost position relative to the main body portion of the game call. The posts 50 engage the rear edges of the slots in the extreme proximal position. Between these two extreme adjustment locations, the reed combination is infinitely adjustable in terms of its longitudinal position relative to the main body portion of the game call apparatus. This adjustability allows users of the call to change the location of the reed combination relative to the sounding board 18 according to their physical attributes and personal preferences, and to change the tones of the call. As shown in FIGS. 7 and 8, moving the reed combination to its forwardmost position (FIG. 8) causes the end of the reed combination to be substantially aligned with the proximal end 26 of the mouthpiece assembly. On the other hand, moving the reed combination to the rearwardmost position places the end of the reed combination at a location short of the proximal end 26 of the reed assembly 16.

As shown in FIGS. 2 and 3, a wedge piece 24 is provided to hold the reeds 20, 22 in the correct longitudinal position relative to the sounding board 18. The wedge piece 24 includes a recessed middle portion 60, a front shoulder 63, and a pressure point extension edge or toe 62. The recessed middle portion 60 allows the wedge piece to float above the reeds 20, 22 (FIG. 9). The toe 62 holds the reeds 20, 22 in position against the sounding board 18 when the wedge piece 24 is installed on the call. The toe 62 provides an edge for precisely holding the reeds 20, 22 against the sounding board to enable the desired sounds to be made. Movement of the reeds 20, 22 longitudinally relative to the sounding board 18 will result in the toe securing the reeds 20, 22 at a different location, thus changing the tones produced by the call.

Referring to FIG. 3 which shows an inverted view of the wedge piece 24, a slot 65 is formed toward an end of the wedge piece opposite the toe 62. A pair of pockets 64 are formed in the wedge piece at each end of the slot 65. The pockets 64 are sized to receive the posts 50 (FIG. 2) extending from the sounding board 18. The combination of the posts 50 and receiving pockets 64 allow the game call to be repeatedly disassembled and reassembled, yet ensure that the various components are put back together in the same manner each time. Once the wedge piece 24 is inserted over the posts 50 with the reeds in place, these game call components will remain in their desired positions while the bell portion 14 and the barrel 12 are installed to complete assembly of the game call apparatus 10.

As shown in FIG. 9, when the wedge piece 24 is inserted over posts 50, the toe 62 of the wedge piece 24 bears upon the reeds 20, 22 to prevent relative movement between the reeds and sounding board 18. Accordingly, once the reed has been positioned to either an extreme forward position (FIG. 8) or an extreme rearward position (FIG. 7) or at any other infinitely variable location in between those extreme positions, the wedge piece 24 will hold the reeds 20, 22 in position relative to the sounding board 18 of the call. The single edge provided by the toe 62 also creates predictable and gradual changes in the tone produced by the game call upon longitudinally adjusting the reeds 20, 22 relative to the sounding board 18.

FIG. 10 shows an enlarged cross-sectional view of a portion of the reed assembly 16. The trough 44 terminates at a beveled surface 72 which terminates at a peripheral edge 70 at the proximal side 26 of the reed assembly 16. Upper surfaces 46, 48 (FIG. 4) of the sounding board 18 intersect to form the beveled surface 72 which extends to the peripheral, outside edge 70. As upper surfaces extend toward beveled surface 72, their respective distances from the lower reed 20 increase to form a space S between the sounding board 18 and the bottom reed 20. Thus, channels 32, 34 and ribs 36, 38, 40 become sequentially spaced at greater distances from reed 20 when moving toward the proximal end 26 of the reed assembly. Although the preferred embodiment of the present invention shows the channels and ribs oriented as shown in FIG. 10, it is to be understood that they may be oriented differently, or the reed combination may be spaced from the sounding board different than what is shown, without departing from the scope of the present invention.

In operation, the adjustability feature of the game call according to the present invention can be utilized according to the desires of the particular user. The user will position the reeds 20, 22 on the call by inserting cut-out areas 52, 54 over posts 50 (see FIG. 2). The longitudinal position of the reeds 20, 22 can thereafter be adjusted. The wedge 24 is then installed with the receiving pockets 64 positioned over posts 50. The toe or edge 62 of the wedge will bear against upper reed 22 to hold both reeds 20, 22 in position relative to the sounding board 18. The bell portion 14 is then inserted over the reed assembly 16 to hold the wedge piece in place. The mouthpiece body 12 is finally inserted completely over the reed assembly 16 and over the outside surface of bell portion 14. If, after assembly, the user desires to reposition the reeds, the call may be disassembled and reassembled after moving the reeds as described above.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications with the proper scope of the appended claims appropriately interpreted in accordance with the doctrine of equivalents.

What is claimed is:

1. A moisture diverter system for a game call apparatus, comprising:

a game call structure to simulate sounds of game animals comprising a main body portion, the main body portion comprising a sounding board;

a centralized, main air passageway formed in the sounding board of the main body portion;

a sound-producing reed positioned on the sounding board;

a plurality of diverters formed on the sounding board of the main body portion, the diverters oriented in a direction angling toward the main air passageway to divert moisture toward the centralized, main air passageway.

2. A moisture diverter system for a game call apparatus according to claim 1 wherein the plurality of diverters comprise ribs.

3. A moisture diverter system for a game call apparatus according to claim 1 wherein the plurality of diverters comprise channels.

4. A moisture diverter system for a game call apparatus according to claim 1 wherein the plurality of diverters comprise a combination of ribs and channels.

5. A method of precisely tuning a game call apparatus, comprising:

providing a game call comprising a main body portion, the main body portion comprising a sounding board having a longitudinal axis;

providing a centralized, main air passageway in the main body portion along the longitudinal axis;

providing a reed securable to the main body portion;

providing a top surface formed in the sounding board, the top surface extending longitudinally along the sounding board adjacent the main air passageway;

providing a plurality of irregularities on the top surface;

positioning a reed within the main air passageway to cover at least a portion of the top surface;

adjusting the irregularities to vary the sound of the call.

6. The method of claim 5 wherein the irregularities comprise channels, each channel having a depth, and wherein the step of adjusting the irregularities comprises changing the depth of the channels.

7. The method of claim 5 wherein the irregularities comprise ribs, each rib having a height, and wherein the step of adjusting the irregularities comprises changing the height of the ribs.

* * * * *